United States Patent [19]

McKechnie et al.

[11] Patent Number: 4,730,897
[45] Date of Patent: Mar. 15, 1988

[54] PROJECTION SCREEN HAVING HIGH RESOLUTION AND GOOD MECHANICAL STABILITY

[75] Inventors: Thomas S. McKechnie, Ossining; Jill F. Goldenberg, Pelham Manor, both of N.Y.

[73] Assignee: North American Philips Corporation, New York, N.Y.

[21] Appl. No.: 40,969

[22] Filed: Apr. 21, 1987

[51] Int. Cl.⁴ .............................................. G03B 21/60
[52] U.S. Cl. .................................. 350/128; 350/126; 350/167
[58] Field of Search ............................. 350/126–129, 350/167

[56] References Cited

U.S. PATENT DOCUMENTS

| | | | |
|---|---|---|---|
| 4,309,073 | 1/1982 | Nishimura et al. | 350/167 X |
| 4,340,275 | 7/1982 | Henkes, Jr. | 350/167 X |
| 4,573,764 | 3/1986 | Bradley | 350/128 |
| 4,679,900 | 7/1987 | McKechnie et al. | 350/126 |

Primary Examiner—Richard A. Wintercorn
Attorney, Agent, or Firm—Thomas A. Briody; William J. Streeter; Marianne R. Rich

[57] ABSTRACT

A screen consists of a clear mechanically stable substrate and a bulk diffuser portion which is as close to the front lenticules as possible. The diffuser may be dispersed within the lenticules or in a separate area immediately adjacent to them. The screen may be a two element screen, either the front or the rear element having the clear substrate. Surface diffusion may be used as an alternative, or in addition to, the bulk diffuser.

21 Claims, 9 Drawing Figures

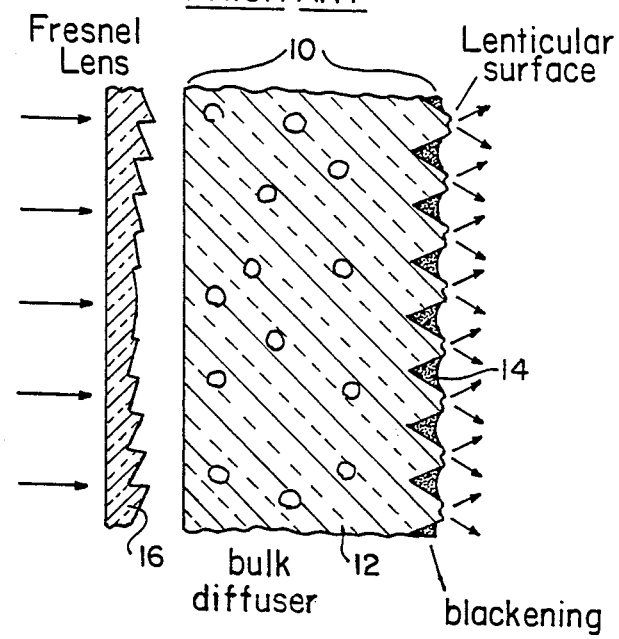
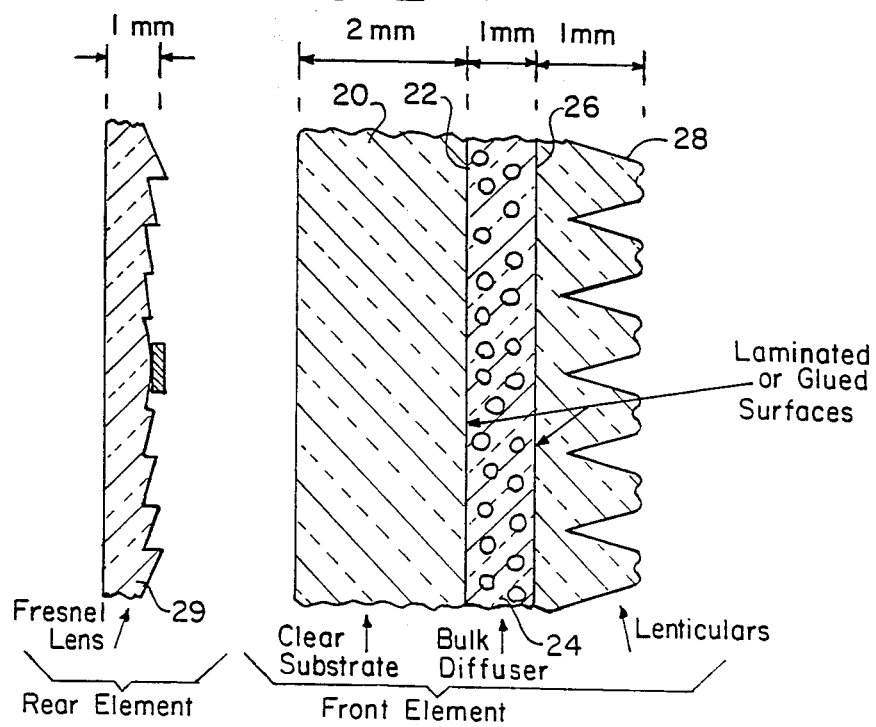

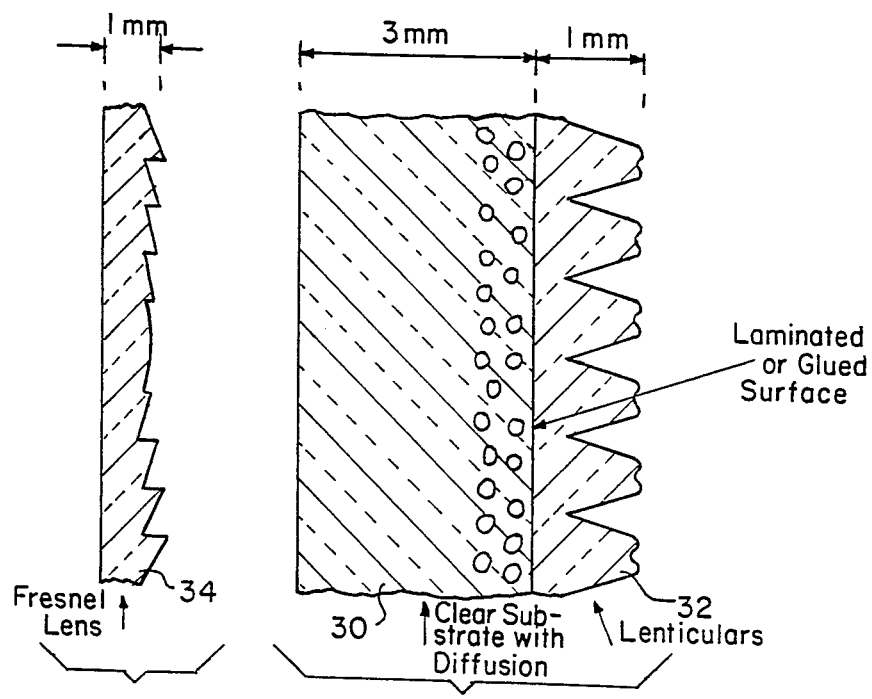
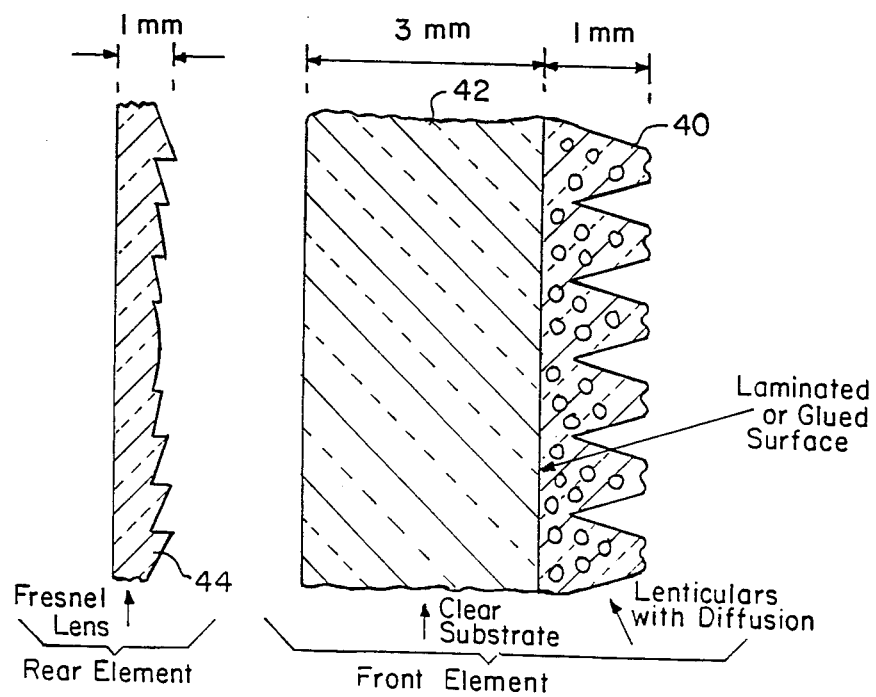

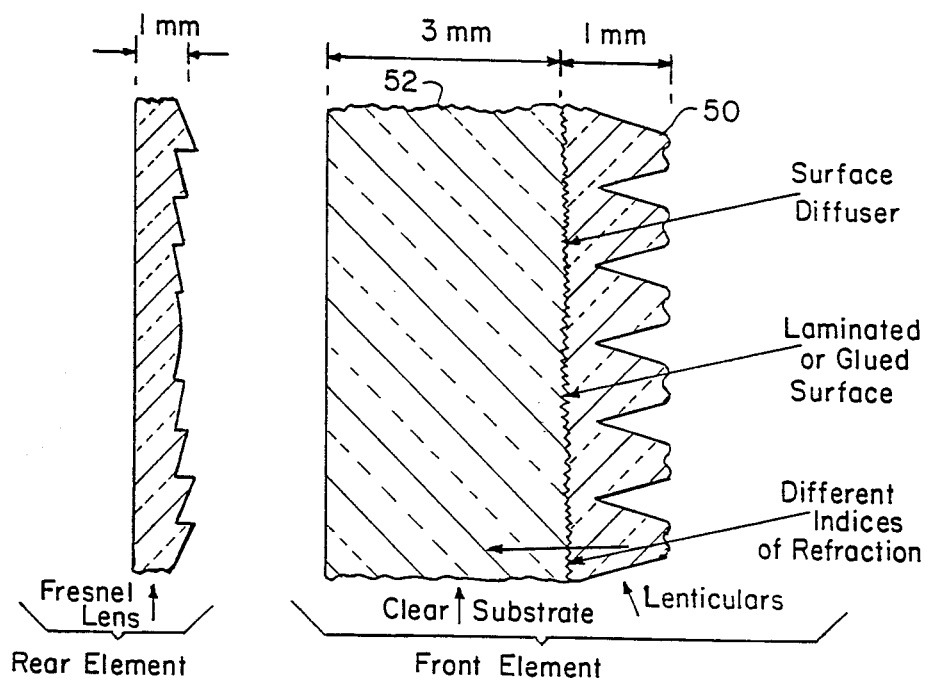
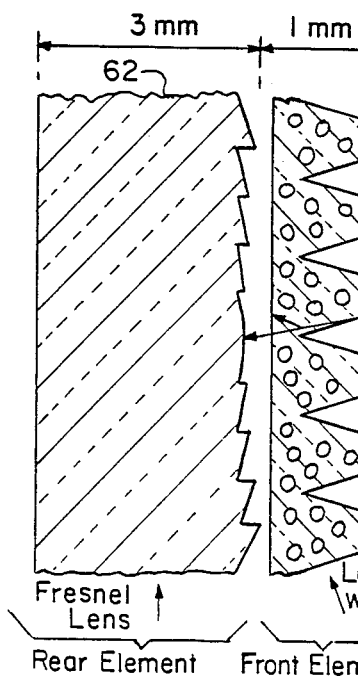
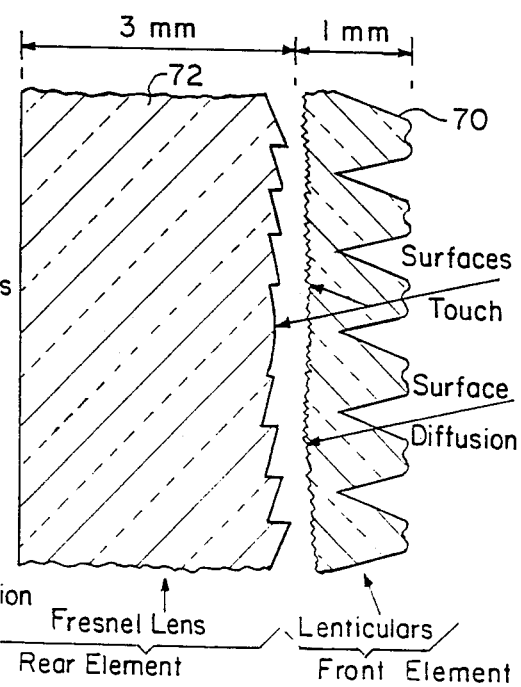

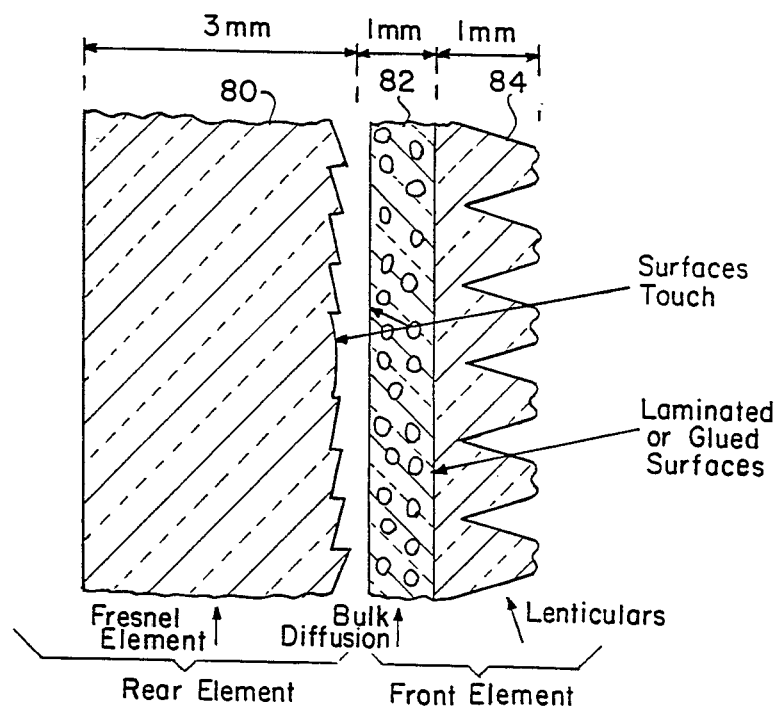
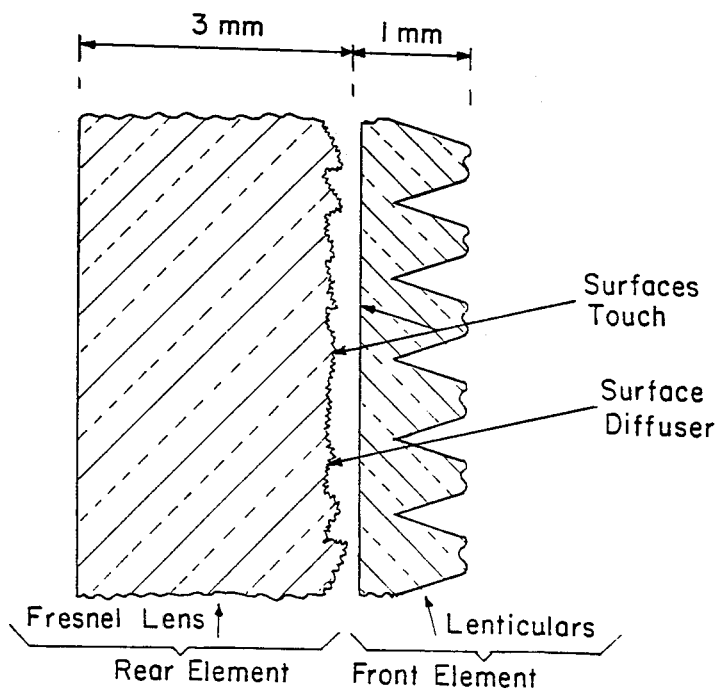

PROJECTION SCREEN HAVING HIGH RESOLUTION AND GOOD MECHANICAL STABILITY

BACKGROUND OF THE DISCLOSURE

1. Field of the Invention

The present invention relates to screens for projection systems, and, more specifically, but not limited to, projection television screens.

2. Description of the Prior Art

A projection television screen having moderately high resolution and good mechanical stability is described in the paper "Ultra-wide Viewing Angle Rear Projection TV Screen" by R. Bradley, J. Goldenberg, and T. S. McKechnie, Proceedings IEEE Transactions on Consumer Electronics, Vol. 31, pp. 185-193, August 1985. FIG. 1 is reproduced from this article. It will be noted that the front element is quite thick, the thickness being expressly chosen to resist warp caused by temperature and/or humidity variations. Spheres are incorporated throughout the front element to diffuse the light. A relatively thin Fresnel lens has an active surface which lies nearest to the viewing audience. The front lenticular portion of the screen is laminated to the bulk diffusing portions to create optical contact between the two and thus minimize reflections from the interface.

In the article "Diffraction Analysis of Bulk Diffusers for Projection Screen Applications" Journal of the Optical Society of America Volume 1, Number 12, December 1985, the inventors of the present invention analyze bulk diffusers by scalar diffraction theory. This article is hereby incorporated by reference into the present application to constitute a part thereof.

SUMMARY OF THE INVENTION

It is an object of the present invention to improve the known designs of projection screens to increase the resolution of the screens while maintaining their mechanical stability.

It is a further object of the present invention to accomplish the above stated goals while, in some cases, reducing the cost of manufacture of the screens.

The projection screen of the present invention includes a clear, mechanically stable substrate and a bulk diffusion zone or a surface diffusing interface which is as close to the lenticules as possible. In a particularly preferred embodiment the diffusing particles are actually dispersed within the lenticules.

If the screen has two elements, the mechanically stable substrate may be part of either the front or the rear element. When the mechanically stable substrate is in the rear element, close proximity of the lenticular element to the substrate may be maintained by giving the lenticular element an inward curvature. The curvature must be sufficient to counteract the outward curvature created in the lenticular element at the most extreme temperature/humidity condition. Alternatively, the lenticular element may be adhered to the substrate at a limited number of points.

BRIEF DESCRIPTION OF THE DRAWING

FIG. 1 shows a horizontal section through a prior art screen;

FIG. 2 is a schematic diagram of a screen having a three-piece front element with diffuser close to the lenticular surface;

FIG. 3 is a schematic diagram of a screen having a two-piece front element with diffusion elements close to the lenticular surface;

FIG. 4 is a schematic diagram of a screen having a two-piece front element with diffuser inside the lenticules;

FIG. 5 is a schematic diagram of a screen having a two-piece front element with surface diffusion;

FIG. 6 is a schematic diagram of a screen having a one-piece front element with diffuser within the lenticular surface, and a thick rear element;

FIG. 7 is a schematic diagram of a screen having a one-piece front element with surface diffusion and a thick rear element with Fresnel lens;

Fig. 8 is a schematic diagram of a screen having a thick rear element with Fresnel lens and a two-piece front element having a rear surface touching the Fresnel surface; and FIG. 9 is a schematic diagram of a screen having a front lenticular element touching a rear Fresnel lens element, the rear Fresnel lens element having surface diffusion.

DESCRIPTION OF THE PREFERRED EMBODIMENTS

The embodiments of the present invention will be discussed with regard to a rear projection screen having the construction shown specifically in U.S. Pat. No. 4,573,764. The invention is, however, no way limited to the particular construction of the lenticules in that patent or to a screen having a lenticular surface and a Fresnel lens surface. Diffusion will enhance the vertical light distribution in any screen. In the particular screen which is the subject of the '764 patent, diffusion is necessary to achieve minimum color shift.

In any screen, as has been shown in the article "Diffraction Analysis of Bulk Diffusers for Projection Screen Applications", J. of Optical Soc. of America, J. Goldenberg and T. S. McKechnie, December 1985, the same diffusion angle can be achieved with a thin as with a thick bulk diffuser, where bulk diffuser is defined as a host medium with minute colloidal particles suspended therein.

Referring now to FIG. 1, the prior art screen, the front element of the screen is denoted by reference numeral 10. It will be noted that the element is quite thick and has diffusion particles suspended throughout the width. A lenticular surface consisting of a plurality of parallel lenticules 12, having a length dimension extending in a direction perpendicular to the surface of the paper, faces the audience viewing the display. The spaces or grooves between adjacent lenticules are filled in part with a blackening material 14. The structure and composition of the lenticules and blackening material are, for example, described in U.S. Pat. No. 4,573,764 and will not be further described here. What is to be noted is that the thickness of the front element causes it to resist warp caused by temperature and humidity variations. Further, the bulk diffusion increases the resolution of the screen to some extent relative to surface diffusion on the rear surface of the front element.

The prior art projection screen also includes a thin rear element 16 whose surface facing front element 10 is constituted by a Fresnel lens structure. According to the '764 patent, by introducing diffusion between the light collimating Fresnel lens and the light spreading lenticular lens elements, the red, blue and green light rays are sufficiently diffused so that a substantially even horizontal dispersion of the respective light rays results, thereby substantially decreasing any color shift phenomena. While the possibility of texturizing one of the surfaces other than the front lenticular surface in order to create surface diffusion is discussed, nothing in the '764 patent points to moving the diffuser particles as closely as possible to the front of the screen, preferably to a location within the lenticules.

Referring now to FIG. 2, locating the diffuser particles closer to the front while maintaining the mechanical stability of the projection screen is accomplished by a front element having a clear substrate 20 to assure mechanical stability. This substrate, in the embodiment illustrated in FIG. 2, is 2 millimeters thick. A bulk diffuser element 24, having a thickness of only 1 millimeter, has a rear surface mechanically affixed to the front surface of substrate 20. Specifically, the two surfaces may be glued together or laminated. Similarly, the front surface 26 of the bulk diffuser portion 24 is laminated to the lenticular portion 28 of the front element. Blackening of the screen is omitted in FIG. 2, since it is not essential for the understanding of the present invention. The thickness of the lenticular portion is also 1 millimeter. The dimensions given in FIG. 2 are illustrative only and are not to be taken as limiting. It will be noted that the Fresnel lens element, namely rear element 29, is relatively thin and is not, therefore, mechanically stable. Because the stability of this element is not critical to the screen performance, no effort need be made to constrain this element or attach it to the front, stable element other than to clamp it by its edge to the other element as is customary in screen manufacture. As an option, the Fresnel lens could be adhered to the stable front element using a small amount of adhesive at the optical center of the Fresnel lens. An absorptive disc 27 may then be used to equalize the brightness at the optical center with that at the remainder of the interface. The latter is decreased by approximately 8% due to reflection.

The overall thickness of the front element and the proximity of the diffusion region to the front lenticular surface gives rise to a screen which has high resolution and good mechanical stability.

In FIG. 3, the bulk diffusion spheres are in the front part of the clear substrate which, as in FIG. 2, is, for example, a thick sheet of clear acrylic. This sheet may be manufactured, for example, by compression molding in such a way that the diffusion spheres which have been introduced as specified, e.g. in "Ultra-Wide Viewing Angle Rear Projection Screen" by Ralph Bradley and the present inventors, IEEE Transactions on Consumer Electronics; V. 31; (3); Aug. 1985, are allowed to settle under gravity towards one surface of the sheet. The settling takes places during the time taken for the sheet to cool. The lenticular portion is then laminated to the side of the bulk diffusion sheet which contains the diffusion spheres. In the example illustrated in FIG. 3, the substrate with diffusion 30 has a thickness of 3 millimeters. Laminated thereto is the lenticular element which, in FIG. 3, has a thickness of 1 millimeter. Again, the front surface of element 30 may be glued to the rear surface of lenticular element 32. The thickness of Fresnel lens 34, which may be identical to Fresnel lens 29 of FIG. 2, is 1 millimeter. Again, the overall thickness of the front element together with the location of the diffusion region in proximity to the front lenticular surface yields a screen having high resolution and good mechanical stability.

In FIG. 4, the diffusion is incorporated into the front lenticular portion 40. The front lenticular portion is then laminated to a thick sheet of acrylic or other suitable material. Again, the thickness of the lenticular element is 1 millimeter, while that of clear substrate 42 is 3 millimeters. A Fresnel lens 44 identical to the previously illustrated Fresnel lens completes the rear projection screen.

In FIG. 5, a front lenticular portion 50 is glued to a thick transparent substrate 52. Surface roughness is used on one or both of the contacting surfaces between clear substrate 52 and lenticular element 50 to effect the light diffusion. The surface roughness and the refractive indices of the materials are chosen to yield the desired diffusion angle. Typically, the index of refraction of the substrate is 1.5, while that of the lenticular portion is 1.6. The substrate is preferably a polymer such as polymethyl methacrylate, or it may be glass. Roughness could be produced by grinding the surface with a rough (e.g. grade 100) carborundum powder. The lenticular portion is preferably made of an ultraviolet cured polymer. The greater the difference between the refractive indices of the two parts, the less roughness is required.

All of the above examples have in common that the diffusion elements are as close to the front of the screen as possible and that front element is sufficiently thick to assure mechanical stability.

A second approach to creating a mechanically stable screen are the embodiments to be described below and illustrated in FIGS. 6–8, wherein a thin front element contains diffusion, while mechanical stability is provided by a thick rear Fresnel lens element.

Referring first to FIG. 6, the front element 60 contains the lenticules in which diffusion particles are dispersed. This element is 1 millimeter thick in the example shown in the figure. However, ranges of from $\frac{1}{2}$ millimeter to $1\frac{1}{2}$ millimeters can readily be accommodated. On the other hand, rear element 62 is a thick, mechanically stable element. The illustrated thickness is 3 millimeters, but typically a range of from 2 to 5 millimeters may be used. The maximum thickness is limited solely by the cost of material.

It should be noted that for this embodiment the front element is manufactured in such a way as to have an inward curvature. This can be accomplished by hot sagging the front element over a mold which possesses the desired curvature. Alternatively, if the blackening elements (not illustrated) in the grooves between adjacent lenticules are black strings, the correct amount of string tension induces stresses to causes the correct amount of curvature. A screen having black strings as blackeners is discussed in the patent application "Improved Blackened Optical Transmission System", U.S. application Ser. No. 729,317, filed May 1, 1985 and assigned to North American Philips Consumer Electronics Corp. This application is hereby incorporated by reference into the present application.

For a screen with a 40 inch diagonal, the front element should have a natural bow depth of between 5 millimeters and 25 millimeters. This would require a radius of curvature of between 5 meters and 20 meters. For larger or smaller screen sizes, the bow depth would have to be adjusted accordingly. In general, it depends upon the temperature and humidity conditions anticipated in the screen's working environment. The temperature effects are less important than the humidity effects, since temperature equilibrium between the inner and outer surfaces of the screen is established more rapidly than equilibrium in the humidity. For increasing temperature and increasing humidity, the outer skin expands resulting in the tendency of the screen to bow outwards. The bow depth created in the manufacture by either of the above mentioned techniques would thus have to compensate for the maximum bowing to be expected under the particular temperature and/or humidity conditions to which the screen will be exposed. An overall tendency to curve inwards should be preserved for the maximum bowing to be expected. This slight curvature would cause the screen to continue pressing against the thick and therefore stable Fresnel element.

The above method can be combined with use of a small amount of transparent adhesive between the Fresnel lens and the lenticular element. This small amount of transparent adhesive should be applied at the optical center, where the Fresnel lens has zero optical power and the faceted surface is substantially flat. The amount of adhesive and its manner of distribution is chosen so as not to degrade the optical or cosmetic properties of the screen. In addition, an absorptive disc, such as the one illustrated in FIG. 2, may be used to decrease the brightness at the optical center of the lens.

Although surface diffusion is not always consistent with high resolution, the resolution effected by the screen of FIG. 7 will be entirely adequate for most purposes. In FIG. 7, front element 70 has surface diffusion on its rear surface. The rear surface in the final assembled screen abuts a Fresnel lens surface of rear element 72. Rear element 72, as in FIG. 6, is a thick, mechanically stable element.

FIGS. 8 and 9 show other variations of the type of embodiment having a thick rear element. In FIG. 8, as in FIG. 6, the rear element is illustrated as being approximately 3 mm thick. In the finished screen its Fresnel surface abuts a bulk diffusion layer 82, which is part of front element 84. The bulk diffusion layer is indicated as being one millimeter thick, while the rear element is indicated as being 3 mm thick. Again, the later may typically lie in the range of between 2 to 5 mm, mechanical stability being the main consideration since loss of light is minimal. Close contact is maintained between the front and rear elements by inducing stress in the front element and/or by adhesion.

The embodiment illustrated in FIG. 9 is similar to that in FIG. 7, except that the surface diffusion is introduced on the surface of the Fresnel lens, rather than on the back surface of the front element.

Although the present invention has been illustrated in preferred embodiments, it is not to be limited thereto. Many variations and changes will occur to one skilled in the art and are intended to be encompassed in the accompanying claims.

We claim:
1. Projection screen comprising:
a mechanically stable front element having a predetermined thickness in a first predetermined direction and comprising a plurality of lenticules, bulk diffuser particles disposed within a first predetermined distance of said lenticules in said first predetermined direction, and a clear substrate for maintaining mechanical stability of said screen and having a substrate thickness substantially exceeding said predetermined distance, in mechanical contact with said lenticules; and
a rear element in mechanical contact with at least part of said clear substrate, said rear element having a lens structure thereon.

2. A projection screen as set forth in claim 1, wherein said lens structure is a Fresnel lens.

3. A projection screen as set forth in claim 1, wherein said bulk diffuser particles are disposed within a bulk diffuser section adjacent said lenticules and having a thickness less than said first predetermined distance.

4. A projection screen as set forth in claim 3, wherein said thickness of said bulk diffuser section is 1 mm.

5. A projection screen as set forth in claim 3, wherein said bulk diffuser section comprises a host medium and a plurality of minute colloidal particles suspended therein.

6. A projection screen as set forth in claim 5, wherein said clear substrate constitutes said host medium, and wherein said bulk diffuser section constitutes part of said clear substrate.

7. A projection screen comprising
a mechanically stable transparent substrate; and
a thin diffusion and lenticular portion mechanically and optically connected to said transparent substrate, whereby the resolution of said screen is increased without loss of mechanical stability.

8. A projection screen as set forth in claim 7, wherein said diffusion and lenticular portion comprises a plurality of lenticules each having diffuser particles dispersed therein.

9. A projection screen as set forth in claim 8, wherein said thin diffusion and lenticular portion has a surface diffuser on one side thereof.

10. A projection screen as set forth in claim 7, wherein said thin diffusion and lenticular portion has a rear surface adjacent said mechanically stable transparent substrate, and said mechanically stable transparent substrate has a front surface adjacent said rear surface of said diffusion and lenticular portion; and wherein said rear surface is a diffusing surface.

11. A projection screen for displaying a picture viewed by an audience, comprising
a lenticular and diffusion element having a first side for displaying said picture to said audience and a second side extending substantially parallel to said first side, the distance between said first side and said second side constituting the thickness of said lenticular and diffusion element; and
a mechanically stable rear element having a front surface adjacent said second side of said lenticular and diffusing element, and a rear surface separated from said front surface by a predetermined thickness.

12. A projection screen as set forth in claim 11, wherein said predetermined thickness substantially exceeds said thickness of said lenticular and diffusing element.

13. A projection screen as set forth in claim 11, wherein said rear element has a Fresnel lens on one surface thereof.

14. A projection screen as set forth in claim 11, wherein said lenticular and diffusing element comprises a plurality of lenticules having diffusers dispersed therein.

15. A projection screen as set forth in claim 11, wherein said planar surface of said lenticular and diffusing element is a diffusion surface.

16. A projection screen as set forth in claim 11, wherein said lenticular and diffusing element has a curvature adapted to cause said lenticular and diffusing element to press against said rear element.

17. A projection screen as set forth in claim 11, further comprising adhesive means for holding said lenticular and diffusing element against said rear element.

18. A projection screen as set forth in claim 11, wherein said lenticular and diffusing element comprises a first portion having said first side and having a plurality of lenticules, and a bulk diffusion portion adjacent said lenticular portion and having a first side adjacent said lenticular portion and a second side adjacent said rear element.

19. A projection screen comprising a thin lenticular element for displaying a picture to an audience; and a mechanically stable rear element having a front diffusing surface adjacent said lenticular element; and means for preventing movement between said lenticular element and said rear element.

20. A projection screen as set forth in claim 19, wherein said movement preventing means comprises transparent adhesive at a plurality of predetermined locations between said lenticular element and said front surface of said rear element.

21. A projection screen as set forth in claim 19, wherein said front surface of said rear element comprises a Fresnel lens having an optical center; and wherein said movement preventing means is at said optical center.

* * * * *